United States Patent
von Dadelszen et al.

(10) Patent No.: US 12,240,055 B2
(45) Date of Patent: Mar. 4, 2025

(54) OPTICAL ZOOM IN ADDITIVE MANUFACTURING

(71) Applicant: VulcanForms Inc., Burlington, MA (US)

(72) Inventors: Michael von Dadelszen, Merrimack, NH (US); Raghav Aggarwal, Somerville, MA (US); Hongqing Sun, Belmont, MA (US)

(73) Assignee: VulcanForms Inc., Burlington, MA (US)

( * ) Notice: Subject to any disclaimer, the term of this patent is extended or adjusted under 35 U.S.C. 154(b) by 402 days.

(21) Appl. No.: 17/356,911

(22) Filed: Jun. 24, 2021

(65) Prior Publication Data
US 2022/0009030 A1    Jan. 13, 2022

Related U.S. Application Data

(60) Provisional application No. 63/049,353, filed on Jul. 8, 2020.

(51) Int. Cl.
*B23K 26/06* (2014.01)
*B22F 10/28* (2021.01)
(Continued)

(52) U.S. Cl.
CPC .......... *B23K 26/0648* (2013.01); *B22F 10/28* (2021.01); *B22F 12/41* (2021.01);
(Continued)

(58) Field of Classification Search
CPC ............ B23K 26/0648; B23K 26/0604; B23K 26/073; B33Y 10/00; B33Y 30/00; B22F 12/45; B22F 12/41; B22F 10/28
(Continued)

(56) References Cited

U.S. PATENT DOCUMENTS 6,204,473 B1 * 3/2001 Legge .................. B23K 26/037
219/121.84
9,956,612 B1    5/2018 Redding et al.
(Continued)

FOREIGN PATENT DOCUMENTS

CN        102084282 A     6/2011
CN        204468266 U     7/2015
(Continued)

OTHER PUBLICATIONS

International Search Report and Written Opinion mailed Oct. 6, 2021 for International Application No. PCT/US2021/038822.

*Primary Examiner* — Thien S Tran
*Assistant Examiner* — Simpson A Chen
(74) *Attorney, Agent, or Firm* — Wolf, Greenfield & Sacks, P.C.

(57) ABSTRACT

Optics assemblies and their methods of use in additive manufacturing systems are described. In some embodiments, an additive manufacturing system may include a build surface, a plurality of laser energy sources configured to produce a plurality of laser spots on the build surface, and an optics assembly configured to independently control a size of each of the plurality of laser spots and a spacing between the plurality of laser spots on the build surface. The optics assembly may include a plurality of lens arrays, where the plurality of lens arrays is configured to adjust a size of each of the plurality of laser spots on the build surface, and at least one lens. The at least one lens may also be configured to adjust a spacing between the plurality of laser spots on the build surface.

30 Claims, 10 Drawing Sheets

(51) Int. Cl.
*B22F 12/41* (2021.01)
*B22F 12/45* (2021.01)
*B23K 26/073* (2006.01)
*B33Y 10/00* (2015.01)
*B33Y 30/00* (2015.01)

(52) U.S. Cl.
CPC .......... *B22F 12/45* (2021.01); *B23K 26/0604* (2013.01); *B23K 26/073* (2013.01); *B33Y 10/00* (2014.12); *B33Y 30/00* (2014.12)

(58) Field of Classification Search
USPC .................................................. 219/121.75
See application file for complete search history.

(56) References Cited

U.S. PATENT DOCUMENTS

| | | | |
|---|---|---|---|
| 10,022,795 | B1 | 7/2018 | Redding et al. |
| 10,406,630 | B1* | 9/2019 | Karlsen ................ G02B 26/105 |
| 2003/0214571 | A1* | 11/2003 | Ishikawa ............ G02B 26/0841 |
| | | | 347/255 |
| 2005/0058175 | A1* | 3/2005 | Gross .................. B23K 26/082 |
| | | | 372/98 |
| 2006/0222041 | A1* | 10/2006 | Moriwaka .......... G02B 27/0961 |
| | | | 372/101 |
| 2007/0030573 | A1 | 2/2007 | Batchko et al. |
| 2011/0007161 | A1 | 1/2011 | Batchko et al. |
| 2016/0158889 | A1 | 6/2016 | Carter et al. |
| 2016/0368050 | A1 | 12/2016 | Morris et al. |
| 2017/0021455 | A1 | 1/2017 | Dallarosa et al. |
| 2017/0056975 | A1 | 3/2017 | Carter et al. |
| 2017/0144224 | A1* | 5/2017 | DeMuth ................... B22F 12/00 |
| 2018/0158703 | A1* | 6/2018 | Aslanov ................ H01L 27/1274 |
| 2018/0193955 | A1* | 7/2018 | Karp ...................... B33Y 30/00 |
| 2018/0200792 | A1 | 7/2018 | Redding et al. |
| 2018/0207722 | A1 | 7/2018 | Feldmann et al. |
| 2018/0229444 | A1* | 8/2018 | Karp ....................... B22F 12/44 |
| 2018/0236549 | A1 | 8/2018 | Spears et al. |
| 2019/0143406 | A1 | 5/2019 | Carter et al. |
| 2019/0273365 | A1 | 9/2019 | Zediker et al. |
| 2019/0299286 | A1* | 10/2019 | Feldmann ........... B23K 26/0732 |
| 2019/0310483 | A1* | 10/2019 | Cheng .................. B23K 26/064 |
| 2020/0016824 | A1 | 1/2020 | Korol et al. |
| 2020/0039000 | A1 | 2/2020 | Sweetland |
| 2020/0108465 | A1 | 4/2020 | Sweetland |
| 2020/0376600 | A1* | 12/2020 | Aggarwal ............ B23K 26/354 |

FOREIGN PATENT DOCUMENTS

| | | |
|---|---|---|
| CN | 107030283 A | 8/2017 |
| CN | 108290180 A | 7/2018 |
| CN | 108845409 A | 11/2018 |

\* cited by examiner

OPTICAL ZOOM IN ADDITIVE MANUFACTURING

CROSS-REFERENCE TO RELATED APPLICATIONS

This application claims the benefit of priority under 35 U.S.C. § 119(e) of U.S. Provisional Application Ser. No. 63/049,353, filed Jul. 8, 2020, the disclosure of which is incorporated herein by reference in its entirety.

FIELD

Disclosed embodiments are related to systems and methods for additive manufacturing.

BACKGROUND

Powder bed fusion processes are an example of additive manufacturing processes in which a three-dimensional shape is formed by selectively joining material in a layer-by-layer process. In metal powder bed fusion processes, one or more laser beams are scanned over a thin layer of metal powder. If the various laser parameters, such as laser power, laser spot size, and/or laser scanning speed are in a regime in which the delivered energy is sufficient to melt the particles of metal powder, one or more melt pools may be established on a build surface. The laser beams are scanned along predefined trajectories such that solidified melt pool tracks create shapes corresponding to a two-dimensional slice of a three-dimensional printed part. After completion of a layer, the powder surface is indexed by a defined distance, the next layer of powder is spread onto the build surface, and the laser scanning process is repeated. In many applications, the layer thickness and laser power density may be set to provide partial re-melting of an underlying layer and fusion of consecutive layers. The layer indexing and scanning is repeated multiple times until a desired three-dimensional shape is fabricated.

SUMMARY

In some embodiments, an additive manufacturing system includes a build surface, a plurality of laser energy sources configured to produce a plurality of lasers to form a plurality of laser spots on the build surface, a plurality of lens arrays configured to adjust a size of each of the plurality of laser spots on the build surface, and at least one lens configured to adjust a spacing between the plurality of laser spots on the build surface.

In some embodiments, an additive manufacturing system includes a build surface, a plurality of laser energy sources configured to produce a plurality of laser spots on the build surface, and an optics assembly configured to independently control a size of each of the plurality of laser spots and a spacing between the plurality of laser spots on the build surface.

In some embodiments, a method of controlling a plurality of laser beams in an additive manufacturing system includes emitting a plurality of laser beams to form a plurality of laser spots on a build surface, independently adjusting a spot size of each of the plurality of laser spots, and independently adjusting a spacing between the plurality of laser spots.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
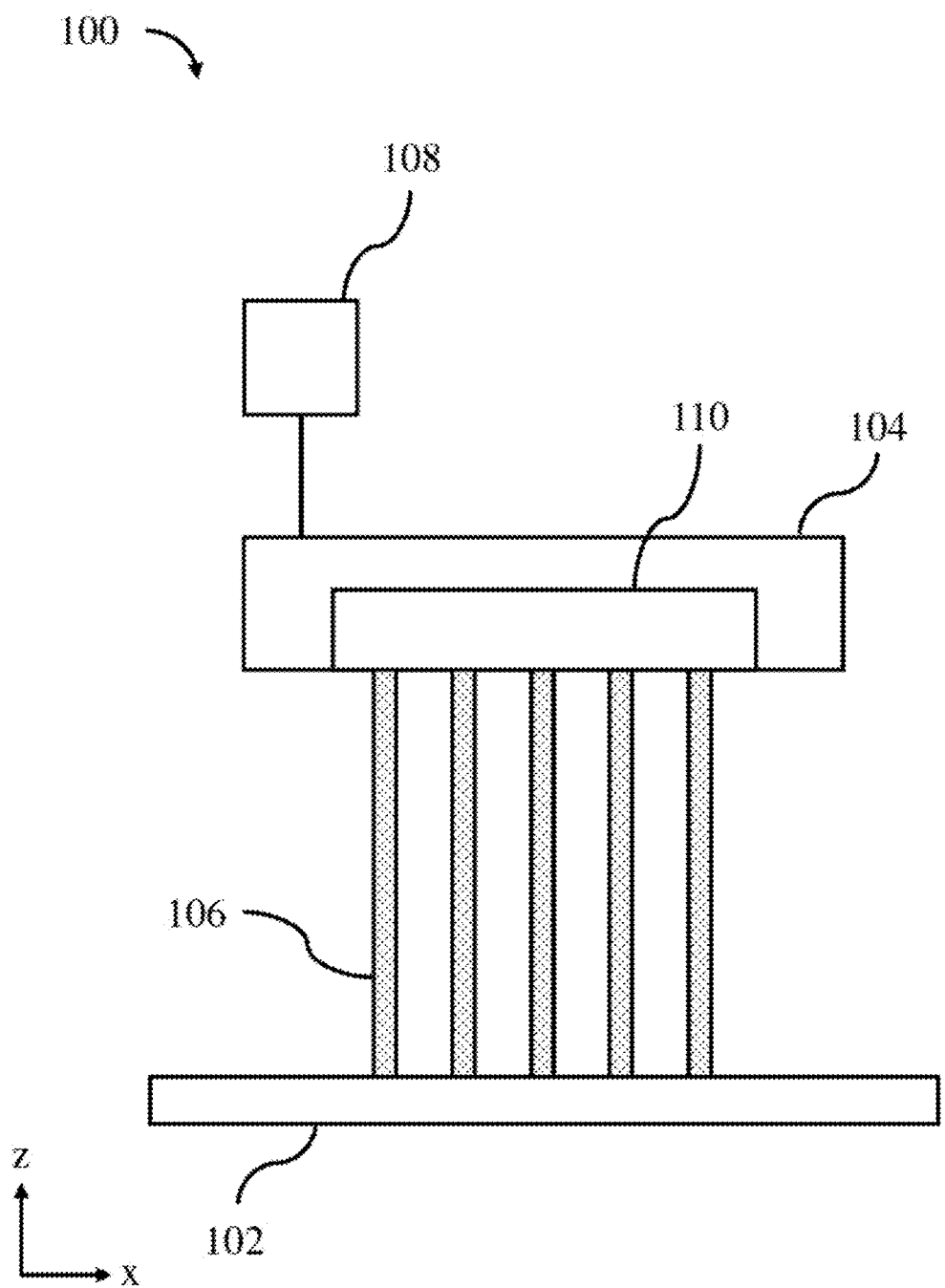
FIG. 1 depicts one embodiment of an additive manufacturing system.

In some additive manufacturing processes, such as powder bed fusion processes, there may be benefits associated with the ability to control multiple different printing parameters. For instance, often, different materials and/or build geometries may benefit from different processing profiles. Thus, varying the power density delivered by one or more lasers to a portion of a build and/or having control over laser translation speed and/or angle may enable a level of control that permits fabrication of complex and/or intricate geometries in a wide range of materials.

Some additive manufacturing machines configured to execute powder bed fusion processes may include a plurality of separate laser energy sources and a plurality of separate laser beams. In some cases, a multi-laser system may be able to activate or deactivate individual lasers. Some multi-laser systems may enable a user to control the power from all lasers as a single parameter, adjusting the power from every laser simultaneously. Some multi-laser systems may enable independent power control for each individual laser. The ability to selectively turn individual lasers on or off, and, in some cases, to selectively adjust the power delivered by each individual laser may enable certain printing capabilities. However, even greater control over print parameters may be desirable.

The inventors have recognized and appreciated that the ability to independently control both the size and spacing of laser beam spots on a build surface in a multi-laser additive manufacturing system may be associated with certain benefits. Generally, selective control over both the size of the laser beam spots as well as the spacing between the separate laser beam spots may be associated with better control over the printing process. As mentioned above, different materials used in additive manufacturing may differ in many respects, and print parameters may be adjusted accordingly. For example, different materials may have different melting temperatures, different heats of fusion, and/or different conductivities, to name a few material properties that may be relevant to a print process. Independent control over laser beam spot size and spacing may expand operating process windows, which may allow tuning of other parameters that may have previously been constrained. Increased control over print parameters may enable the processing of non-homogenous materials and/or may enable multi-material printing.

In some embodiments, an additive manufacturing system with independent control over both laser beam spot size and spacing may include an optics assembly with two stages. The first stage may include one or more micro optics assemblies, and the second stage may include one or more macro optics assemblies. Each micro optics assembly may be configured to adjust a size of a single laser beam and each laser beam may be associated with a separate micro optics assembly. The outputs of the micro optics assemblies may be fed into one or more macro optics assemblies, and in some instances a single macro optics assembly. The macro optics assembly may be configured to adjust both the size of each individual laser beam as well as a spacing between the different laser beams. With two variables (i.e., beam size and beam spacing) and two control inputs (i.e., control over a micro optics assembly and macro optics assembly), the first and second stages of the optics assembly may be adjusted in tandem to enable independent control over beam size and beam spacing.

The inventors have recognized and appreciated that an optics assembly with distinct stages may be associated with numerous advantages. Such systems may be configured to accommodate a large range of input laser powers, from as little as 50 W to as much as 1 kW or more. Additionally, a multi-stage optics assembly may be configured to scale across a vast number of individual lasers, potentially leading to arrays with thousands of individual lasers. With simultaneous adjustment of the micro optics assemblies, the macro optics assembly, and the individual laser power, a user may independently adjust beam intensity, beam spot size, and beam spacing. In this way, a user may tune laser parameters to better match certain material properties and/or desired build geometries.

In some embodiments, the laser beams may be single mode, while in some embodiments the lasers may be multimode. Single mode Gaussian beams may include Gaussian propagation behavior whereas multimode beams may include imaging behavior. Gaussian propagation may allow the optics assembly to deliver a desired beam size at a focused beam waste, which may be associated with an extended depth of focus at the build surface (e.g., up to 1 mm, depending at least in part on nominal beam size at the build surface and allowed variability in the beam size, as well as wavelength and other system properties). Consequently, tolerances of other aspects of the additive manufacturing system may be loosened. Multimode beams may be associated with beam spot images of a desired size at the build surface wherein the depth of focus may be governed by standard imaging parameters, including but not limited to numerical aperture and wavelength, along with the allowed variations in the beam profiles at the build surface. Multimode beams may reduce the depth of focus compared to single mode beams, but may also be associated with reduced peak power intensity levels on optical components and/or looser tolerances for delivery optics assembly alignment into the optics assembly. Depending at least in part on system level design parameters for the overall additive manufacturing system, either single mode beams with a relatively large depth of focus or multimode beams with a smaller depth of focus may be employed.

The inventors have appreciated that the ability to control the range of angles of incidence of the individual beams onto the build surface across the full field of view of the optics assembly may be associated with additional benefits. Without wishing to be bound by theory, the closer the incident angle is to being telecentric (i.e., a normal incidence of the chief rays onto the build surface across the full field of view), the more uniform the spot size on the build surface may be, due at least in part to reduced inverse cosine errors. Furthermore, telecentricity may be associated with negligible variation in the separations of the individual beams at the build surface as the focus distance from the optical assembly to the build surface is varied, which may be associated with potentially loosened tolerances for other aspects of the additive manufacturing system. Without wishing to be bound by theory, if the range of incident angles is too large, beam separation variability may be a non-negligible driver of effective depth of focus rather than changes in beam size at the build surface.

The inventors have additionally appreciated that separating the optics assembly into two subassemblies may have numerous advantages. In some embodiments, the properties and tolerances of the individual beams may be controlled primarily by the micro optics assembly, whereas performance over the full field of view may be controlled primarily by the macro optics assembly. Specifically, desired nominal values and allowed variations in individual beam parameters (e.g., beam size, beam profile, and/or clear aperture (minimizing finite aperture diffraction effects)) may inform the prescription and tolerances for the micro optics assembly, whereas desired properties and allowed variability across the full field of view (e.g., magnification, working distance, resolution, distortion, field curvature, spherical aberrations, Strehl ratio, and/or telecentricity) may inform the prescription and tolerances of the macro optics assembly. Excess distortion, for example, may be associated with undesirable variations in separation of neighboring beams across the field of view. The separation of the micro optics and macro optics assemblies may be associated with benefits related to simplifying the optical and optomechanical design of the combined full optics assembly, as well as reducing cost and complexity of manufacturing, assembly, and volume production.

In some embodiments, the individual beams may be delivered to the optics assembly via fiber optics or other similar components. At high optical power levels, even relatively small fractions of the total power that might be propagating in the high numerical aperture cladding of the optical fibers may be associated with highly divergent stray light power propagated into the optics assembly. Diligent implementation methods may remove this stray light from within the micro optics assembly before it can propagate into the macro optics assembly. Conversely, the macro optics assembly may contain a multitude of lens elements, each of which may include anti-reflection coatings. Even so, some fraction of the total system power may be reflected backwards into the optics assembly from each macro lens surface. Diligent implementation methods may remove this reflected stray light from within the macro optics assembly before it can propagate back into micro optics assembly.

In some embodiments, an additive manufacturing system may include a build surface and a plurality of laser energy sources configured to produce a plurality of lasers. The plurality of lasers may be configured to form a plurality of laser spots on the build surface. The additive manufacturing system may also include a plurality of lenses, which may be in the form of one or more lens arrays or microlens arrays, configured to adjust a size of each of the plurality of laser spots on the build surface. Accordingly, a spacing between the associated lenses, or lens arrays, may be adjustable to control a size of each laser as it passes through the corresponding optics. In the case where arrays are used, adjusting a spacing between the arrays may adjust the size of each laser beam associated with the lens arrays, or microlens arrays, at the same time. The plurality of lens arrays may be associated with one or more micro optics assemblies, as explained in greater detail below. The additive manufacturing system may also include at least one lens configured to adjust a spacing between the plurality of laser spots on the build surface. The at least one lens may be associated with a macro optics assembly, as explained in greater detail below. In some embodiments, the at least one lens may include a single lens, a plurality of lenses, and/or a lens array. Thus, in some embodiments, an additive manufacturing system may include an optics assembly configured to independently control a size of each of the plurality of laser spots and a spacing between the plurality of laser spots on the build surface. Specifically, in view of the above, the optics assembly may include a plurality of lens arrays configured to adjust a size of each of the plurality of laser spots on the build surface, and at least one lens configured to adjust a spacing between the plurality of laser spots on the build surface.

Depending on the embodiment, the separate micro optics assemblies used to control the size of laser beams emitted by the plurality of laser sources may either be distinct, separately controlled components or they may be coupled such that the separate micro optics assemblies may be controlled together. In the case of separate micro optics assemblies being used, each assembly may be individually adjustable such that the size of each laser beam is individually controllable. However, as noted above, in some embodiments, one or more portions of a particular micro optics assembly may be coupled structurally and/or functionally with one or more portions of one or more other micro optics assemblies. For example, the micro optics assemblies may correspond to a plurality of optically coupled lens arrays, or micro lens arrays, where adjusting the spacing between the different arrays may control a size of each laser beam optically coupled with the individual lenses of the lens arrays. Thus, in some embodiments, the size of each laser beam may be adjusted simultaneously using a combined micro optics assembly where each laser is associated with individual sets of lenses contained in the lens arrays that are controlled together.

As noted above, in some embodiments, corresponding lenses of different micro optics assemblies may be combined in a single lens array. That is, a single lens array may include a plurality of lenses, such that each lens of the lens array may be associated with a different micro optics assembly. For example, a single micro optics assembly may include m lenses, and a first stage of an optics assembly may include n micro optics assemblies. In some embodiments, each lens of each micro optics assembly may be separate and distinct. In some embodiments, corresponding lenses from different micro assemblies may be coupled. Correspondingly, a first stage of an optics assembly may include in lens arrays, wherein each lens array includes n distinct lenses. Adjusting the positions of the lens arrays may be associated with adjusting the sizes of all of the laser beams and/or a focal plane of all of the laser beams, as explained in greater detail below. However, embodiments in which a single lens array is used for the micro optics assembly of an additive manufacturing system are also contemplated.

It should be appreciated that the terms "lens" and "lens array" should not be understood as limiting. In some embodiments, the term "lens" may be used to refer to a microlens, which may be understood as a small lens with a diameter less than one millimeter. In some embodiments, including but not limited to embodiments in which a plurality of microlenses are arranged in an array, a diameter of a microlens may be up to five millimeters. Similarly, in some embodiments, the term "lens array" may be used to refer to a microlens array, which may be understood as an array of microlenses. In some embodiments, a microlens array may include a monolithic array of microlenses or a plurality of distinct microlenses arranged in an array.

In some embodiments, a diameter of a laser beam entering a micro optics assembly may be greater than or equal to 1 micron, 5 microns, 10 microns, 20 microns, 50 microns, or 100 microns. In some embodiments, a diameter of a laser beam entering a micro optics assembly may be less than or equal to 500 microns, 100 microns, 50 microns, 20 microns, 10 microns, or 5 microns. Combinations of foregoing are contemplated including, for example, a diameter of a laser beam entering the micro optics assembly that is between or equal to 1 micron and 500 microns. In some embodiments, a diameter of a laser beam exiting a micro optics assembly may be greater than or equal to 10 microns, 50 microns, 100 microns, 200 microns, or 500 microns. In some embodiments, a diameter of a laser beam exiting a micro optics assembly may be less than 1000 microns, 500 microns, 200 microns, 100 microns, or 50 microns. Combinations of the foregoing are contemplated including, for example, a diameter of a laser beam exiting a micro optics assembly that is between or equal to 10 microns and 1000 microns. In some embodiments, a magnification factor of a micro optics assembly (e.g., the ratio of output beam diameter to input beam diameter) may be greater than or equal to 0.1×, 0.5×, 1×, 2×, 5×, 10×, 20×, or 50×. In some embodiments, a magnification factor of a micro optics assembly may be less than or equal to 100×, 50×, 20×, 10×, 5×, 2×, or 1×. Combinations of foregoing are contemplated including, for example, a magnification factor that is between or equal to 0.1× and 100×. Of course, a micro optics assembly may be associated with input beam diameters, output beam diameters, and/or magnification factors other than those listed above, including ranges both greater than and less than those noted above, as the disclosure is not limited in this regard.

An output laser beam of a micro optics assembly may be focused or imaged at a predetermined distance from an end of the micro optics assembly. This distance may be adjusted based on the arrangement of the optics within the micro optics assembly. As explained in greater detail below, each micro optics assembly may focus its corresponding output laser beam at the same distance, such that all micro optics assemblies share a single intermediate image plane. In some embodiments, the plurality of lenses (or one or more lens arrays) of the first stage may be configured to maintain an intermediate image plane at a fixed position between the plurality of lenses (or one or more lens arrays) of the first stage and the at least one lens of the second stage.

As described above, in some embodiments, an additive manufacturing system may include an optics assembly with a first stage and a second stage. The intermediate image plane may be disposed between the first and second stages of the optics assembly. In some embodiments, the second stage of the optics assembly may include a macro optics assembly configured to adjust the sizes and spacing of one or more laser beams. The macro optics assembly may be configured to re-image the intermediate image plane to the build surface with a variable magnification while maintaining a constant working distance. In some embodiments, a single macro optics assembly may be configured to receive all of the laser beams that are output from the plurality of micro optics assemblies, and subsequently change a magnification of the entire beam array. As explained in greater detail below, the macro optics assembly may be able to adjust a magnification of the entire beam array while focusing each laser beam on the build surface.

In some embodiments, a diameter of a laser beam entering a macro optics assembly may be greater than or equal to 10 microns, 50 microns, 100 microns, 200 microns, or 500 microns. In some embodiments, a diameter of a laser beam entering a macro optics assembly may be less than or equal to 1000 microns, 500 microns, 200 microns, 100 microns, or 50 microns. Combinations of the foregoing are contemplated including, for example, a diameter of a laser beam entering a macro optics assembly that is between or equal to 10 microns and 1000 microns. In some embodiments, a diameter of a laser beam exiting a macro optics assembly may be greater than or equal to 10 microns, 50 microns, 100 microns, 200 microns, or 500 microns. In some embodiments, a diameter of a laser beam exiting a macro optics assembly may be less than 1000 microns, 500 microns, 200 microns, 100 microns, or 50 microns. Combinations of the foregoing are contemplated including, for example, a diameter of the laser beam exiting a macro optics assembly that is between or equal to 10 microns and 1000 microns. Of course, sizes of laser beams entering and exiting a macro optics assembly both greater than and less than the ranges noted above are also contemplated as the disclosure is not limited in this fashion.

A spacing between laser beams entering a macro optics assembly may depend at least in part on a spacing between adjacent micro optics assemblies and/or a spacing between adjacent laser energy sources. In some embodiments, a spacing between laser beams entering a macro optics assembly may be greater than or equal to 50 microns, 100 microns, 200 microns, 500 microns, or 1000 microns. In some embodiments, a spacing between laser beams entering a macro optics assembly may be less than or equal to 5000 microns, 1000 microns, 500 microns, 200 microns, or 100 microns. Combinations of the foregoing are contemplated including, for example, a spacing between laser beams entering a macro optics assembly that is between or equal to 50 microns and 5000 microns. In some embodiments, a spacing of laser beams exiting a macro optics assembly may be greater than or equal to 50 microns, 100 microns, 200 microns, 500 microns, or 1000 microns. In some embodiments, a spacing of laser beams exiting a macro optics assembly may be less than 5000 microns, 1000 microns, 500 microns, 200 microns, or 100 microns. Combinations of the foregoing are contemplated including, for example, a spacing between laser beams exiting a macro optics assembly that is between or equal to 50 microns and 5000 microns. However, embodiments in which a spacing between laser beams entering or exiting a macro optics assembly with spacings both greater than and less than those noted above are also contemplated.

In some embodiments, a magnification factor of a macro optics assembly (e.g., the ratio of output beam diameter to input beam diameter, or the ratio of the output beam spacing to the input beam spacing) may be greater than or equal to 0.1×, 0.25×, 0.5×, 1×, 2×, or 5×. In some embodiments, a magnification factor of a macro optics assembly may be less than or equal to 10×, 5×, 2×, 1×, 0.5×, or 0.25×. Combinations of foregoing ranges are contemplated including, for example, a magnification factor or spacing ratio may be between or equal to 0.1× and 10×. Of course, a macro optics assembly may be associated with input beam diameters, output beam diameters, and or magnification factors other than those listed above, as the disclosure is not limited in this regard.

In some embodiments, a micro optics assembly may include a plurality of different optical components including, for example, a micro lens, a micro lenslet, a micro lens array (i.e., lenslet array), a filter, a prism, a mirror, and or any other optical component configured to adjust an optical parameter. In some embodiments, a micro optics assembly may include at least three lenses with a variable spacing between at least two of the three lenses. In some embodiments, a micro optics assembly may include at least three lenses with a variable spacing between any two of the three lenses. For example, positions of the second and third lenses may be adjustable relative to the first lens, and relative to each other. In some embodiments, a first lens may be configured to collimate a laser beam entering the micro optics assembly. In some embodiments, the first lens may include cross cylinder lenses, crossed Powell lenses, crossed cylinder lens arrays, crossed Powell lens arrays, a cylinder lens crossed with a cylinder lens array, a Powell lens crossed with a Powell lens array, a spherical lens, an aspherical lens, a spherical lens array, an aspherical lens array, or any other suitable lens and/or combination of lenses. In some embodiments, the second and third lenses may form a doublet lens. In some embodiments, the second and/or third lens may include cross cylinder lenses, crossed Powell lenses, crossed cylinder lens arrays, crossed Powell lens arrays, a cylinder lens crossed with a cylinder lens array, a Powell lens crossed with a Powell lens array, a spherical lens, an aspherical lens, a spherical lens array, an aspherical lens array, or any other suitable lens and/or combination of lenses. In some embodiments, each lens of a micro optics assembly may be physically the same, and only relative positions between the lenses may change.

The relative distances between the lenses of a micro optics assembly may control an output beam size and a distance to a focal plane (or image plane) of the micro optics assembly. In some embodiments, adjusting a distance between the second and third lenses may adjust the size of the output laser beam. That is, in some embodiments, adjusting a distance between the second and third lenses may adjust the magnification factor of the micro optics assembly. In some embodiments, adjusting a distance between first lens and second lens may adjust a distance to the focal plane. As such, adjusting a location of the doublet lens (i.e., the second and third lenses) relative to the first lens in conjunction with adjusting a distance between the lenses within the doublet lens (i.e., the second and third lenses) may enable a user to maintain a constant focal plane (or image plane) regardless of magnification. In this way, the position of the intermediate image plane may remain in a constant location between the micro optics assemblies and the macro optics assembly.

Individual lenses within a micro optics assembly may be adjusted in any suitable manner. In some embodiments, a position and/or an orientation of one or more lenses may be adjusted. In some embodiments, a position and/or orientation of a lens may be continuously adjustable, or may be constrained to a finite number of discrete, predetermined positions and/or orientations. In some embodiments, adjusting a position and/or orientation of a lens may be automated, using any suitable number and/or arrangement of actuators and/or passive elements. Actuators may include brushless motors, brushed motors, stepper motors, linear stages, belt drives, hydraulic actuators, pneumatic actuators, piezoelectric actuators, voice coil actuators, and/or any other suitable actuator configured to adjust a position and/or orientation of a lens. Passive elements may include ball bearings, roller bearings, thrust bearings, air bearings, magnetic bearings, bushings, or any other suitable element. In some embodiments, a position and/or orientation of a lens may be adjusted manually. Manual adjustments may include moving lenses to different slots within a guide rail, adjusting a set screw, installing custom fixtures, and/or any other suitable manner of manual adjustment of a position and/or orientation of a lens.

As described above, in the various embodiments described herein, lenses from different micro optics assemblies may be coupled in lens arrays. In some embodiments, an additive manufacturing system may include a plurality of lens arrays. In some embodiments, a plurality of lens arrays may include a plurality of lenslet arrays. A lenslet array (or a microlens array) may be desirable in some embodiments, particularly in additive manufacturing systems with a large number of individual lasers. Using a common lenslet array across multiple micro optics assemblies rather than using separate lenslets (or lenses) for each micro optics assembly may have benefits associated with higher density (and/or closer packing) of laser beams, lesser numbers of actuators and/or control elements, and an overall simpler control strategy.

In general, the descriptions of micro optics assemblies with separate lenses apply as well to micro optics assemblies with shared lens arrays and/or shared lenslet arrays. In some embodiments, a plurality of lens arrays may include a first lens array, a second lens array, and a third lens array. The first lens array may be configured to collimate a plurality of laser beams emitted by a plurality of laser energy sources of the additive manufacturing system. The second lens array and the third lens array form a doublet lens array. A spacing between the first lens array and the doublet lens array may be variable to adjust a position of an intermediate image plane. A spacing between the second lens array and the third lens array may be variable to adjust the size of each of the plurality of laser spots on the build surface.

In some embodiments, a spacing between at least two lens arrays of a plurality of lens arrays may be variable to adjust the size of each of the plurality of laser spots on the build surface. In some embodiments, at least one actuator may be configured to control a position of at least one lens array of the plurality of lens arrays of the micro optics assembly and/or the at least one lens of the associated macro optics assembly to provide independent control of the size and/or the spacing of the plurality of laser spots on the build surface. Alternatively, in some embodiments using manual positioning of the optics, each slot of a plurality of slots may be configured to receive at least one lens array of the plurality of lens arrays and/or the at least one lens to hold the at least one lens array and/or the at least one lens in a predetermined configuration to provide independent control of the size and/or the spacing of the plurality of laser spots on the build surface.

While the above description regarding arrangements and adjustments of lenses has been presented in relation to a micro optics assembly, it should be appreciated that an analogous discussion may be applied to the macro optics assembly. In some embodiments, the macro optics assembly may be structured very similarly to a micro optics assembly in terms of number, arrangement, and/or adjustment of lenses. However, a macro optics assembly may differ from a micro optics assembly in that a macro optics assembly may be configured to receive a plurality of laser beams, whereas a micro optics assembly may be configured to receive a single laser beam. Of course, in some embodiments, a macro optics assembly and a micro optics assembly may have substantially different numbers and/or arrangements of lenses and/or other optical components, and/or different adjustment mechanisms. Accordingly, it should be understood that the disclosure is not limited to any particular arrangement and/or control of optical elements within a micro optics assembly or a macro optics assembly.

A micro optics assembly may be located "upstream" of a macro optics assembly, such that a laser beam emitted from a laser source may enter a micro optics assembly prior to entering a macro optics assembly. In some embodiments, a plurality of lens arrays associated with a plurality of micro optics assemblies may be located before at least one lens associated with a macro optics assembly along an optical path of the plurality of lasers from the plurality of lenses.

In some embodiments, an additive manufacturing system may include a processor. The processor may be operatively coupled to a plurality of laser energy sources, a first actuator, and a second actuator. The first actuator may be configured to control a spacing between at least two lens arrays of the one or more micro optics assemblies of the additive manufacturing system. The second actuator may be configured to control a spacing between the at least two lens arrays of the micro optics assemblies and at least one lens associated with a macro optics assembly of the additive manufacturing system. The processor may be configured to independently control an intensity of a plurality of laser beams, the size of the plurality of laser spots, and the spacing between the plurality of laser spots based on the commanded relative positions and/or orientations of the various lens arrays and/or lenses. Thus, the processor may control the size of the plurality of laser spots and the spacing between the plurality of laser spots by actuating the first actuator and/or the second actuator.

In some embodiments, a method of controlling a plurality of laser beams in an additive manufacturing system may include emitting a plurality of laser beams to form a plurality of laser spots on a build surface, independently adjusting a spot size of each of the plurality of laser spots, and independently adjusting a spacing between the plurality of laser spots. In some embodiments, the method may include melting material disposed on the build surface using the plurality of laser beams and/or translating the plurality of laser beams across the build surface.

In some embodiments, independently adjusting a spot size of each of the plurality of laser spots may include adjusting a position of at least one lens array of a plurality of lens arrays. A lens array may be associated with one or more micro optics assemblies, as discussed above. Adjusting the position of the at least one lens array may include actuating an actuator operatively coupled to the at least one lens array and/or disposing the at least one lens array in a slot or other fixture configured to hold the at least one lens array in a predetermined configuration. Correspondingly, independently adjusting a spacing between the plurality of laser spots may include adjusting a position of at least one lens of a macro optics assembly, as discussed above. Adjusting the position of the at least one lens may include actuating an actuator operatively coupled to the at least one lens and/or disposing the at least one lens in a slot or other fixture configured to hold the at least one lens in a predetermined configuration.

In some embodiments, an additive manufacturing system may include one or more laser beams arranged in an array. An array may include a linear array, a rectangular array, a staggered array, a hexagonal array, or any other appropriate array arrangement. An array may include a repeated pattern, which may be a continuous pattern or a discontinuous pattern. In some embodiments, adjacent laser beams of an array may be in contact, while in other embodiments adjacent laser beams may be spaced apart. An array may include a sparse array or a dense array. For example, an array may include a two dimensional dense packing array in some embodiments. An array may be periodic or aperiodic. For example, in some embodiments, an array of laser beams may include a semi-random or entirely random distribution of laser beams. An array may be symmetric or asymmetric. In some embodiments, an additive manufacturing system may include a plurality of laser beams not arranged in an array. Thus, it should be appreciated that an additive manufacturing system may include any suitable number of laser beams disposed in any suitable arrangement, as the disclosure is not limited in this regard.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 depicts one embodiment of an additive manufacturing system 100. The additive manufacturing system 100 may include a build surface 102 and a laser assembly 104. The build surface 102 may include a build plate, a portion of a printed part, or any other surface upon which a part or a portion of a part may be additively manufactured. The laser assembly 104 may include an optics assembly 110 configured to emit one or more laser beams 106. The additive manufacturing system 100 may additionally include a processor 108, which may include an associated memory configured to store processor-executable instructions to perform the methods described herein. The processor 108 may be operatively coupled to the laser assembly 104, and any components therein, including but not limited to the optics assembly 110 and/or sources of the laser beams 106.

Figure 2:
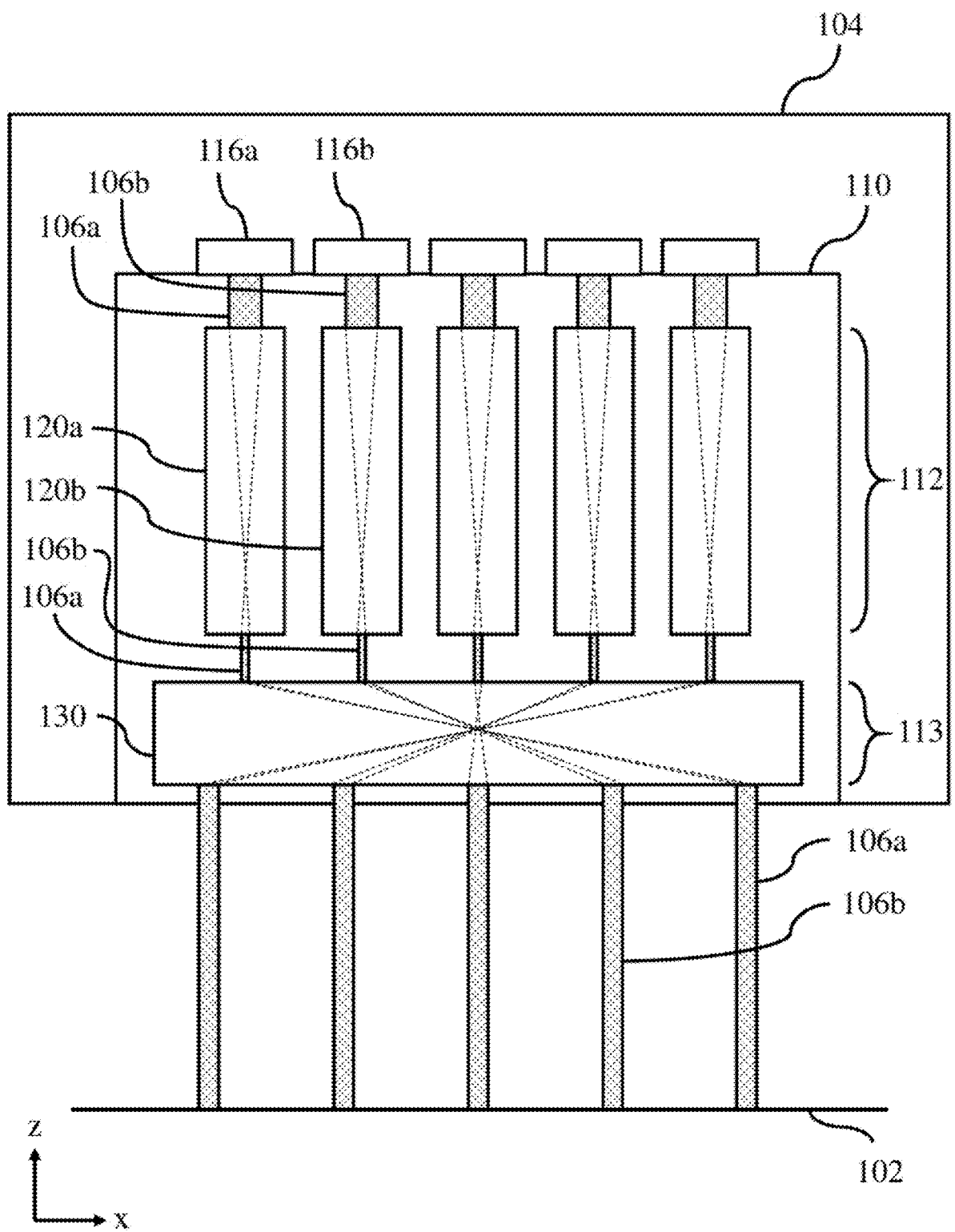
FIG. 2 depicts one embodiment of an optics assembly of an additive manufacturing system.

FIG. 2 depicts one embodiment of an optics assembly 110 of a laser assembly 104 of an additive manufacturing system. The optics assembly 110 may include a first stage 112 and a second stage 113. The first stage 112 may include a plurality of micro optics assemblies, such as micro optics assemblies 120a and 120b. The second stage 113 may include a macro optics assembly 130. A plurality of laser sources, such as laser sources 116a and 116b, may be coupled to the optics assembly 110. It should be appreciated that a laser source may be coupled to an optics assembly in any suitable manner, including but not limited to the use of any appropriate number of optical fibers and/or other optical elements. Laser beams 106 emitted by the laser sources 116 may pass through at least one micro optics assembly 120 and the macro optics assembly 130. In some embodiments, each laser source 116 may be associated with a dedicated micro optics assembly 120, such that a laser beam emitted from a particular laser source 116 may be associated with a particular micro optics assembly 120. For example, laser beam 106a may be emitted from a laser source 116a and pass through an optically coupled micro optics assembly 120a, while laser beam 106b may be emitted from a laser source 116b and pass through a separate optically coupled micro optics assembly 120b. Regardless of the number and/or arrangement of micro optics assemblies 120, each laser beam may be associated with the macro optics assembly 130. For example, in the embodiment of FIG. 2, five separate laser sources 116 are depicted, along with five separate micro optics assemblies 120, and a single macro optics assembly 130.

While separate micro optics assemblies have been depicted in the figure, in some embodiments, components of one micro optics assembly may be coupled with components of another micro optics assembly. In one such embodiment, one or more lens arrays (or lenslet arrays) may span a plurality of micro optics assemblies. For example, consider a first stage of an optics assembly with five micro optics assemblies, each of which includes three lenses. In one embodiment, each micro optics assembly may be entirely independent, and the first stage may include fifteen separate lenses. In one embodiment, corresponding lenses of different micro optics assemblies may be coupled, such as in a lens array, such that the first stage may include only three lens arrays, each of which may include five lenses. The latter configuration may have certain advantages related to closely packing a large number of lasers in a small space and/or simplified control of the lens position of the combined micro optics assembly for the different lasers.

Figure 3A:
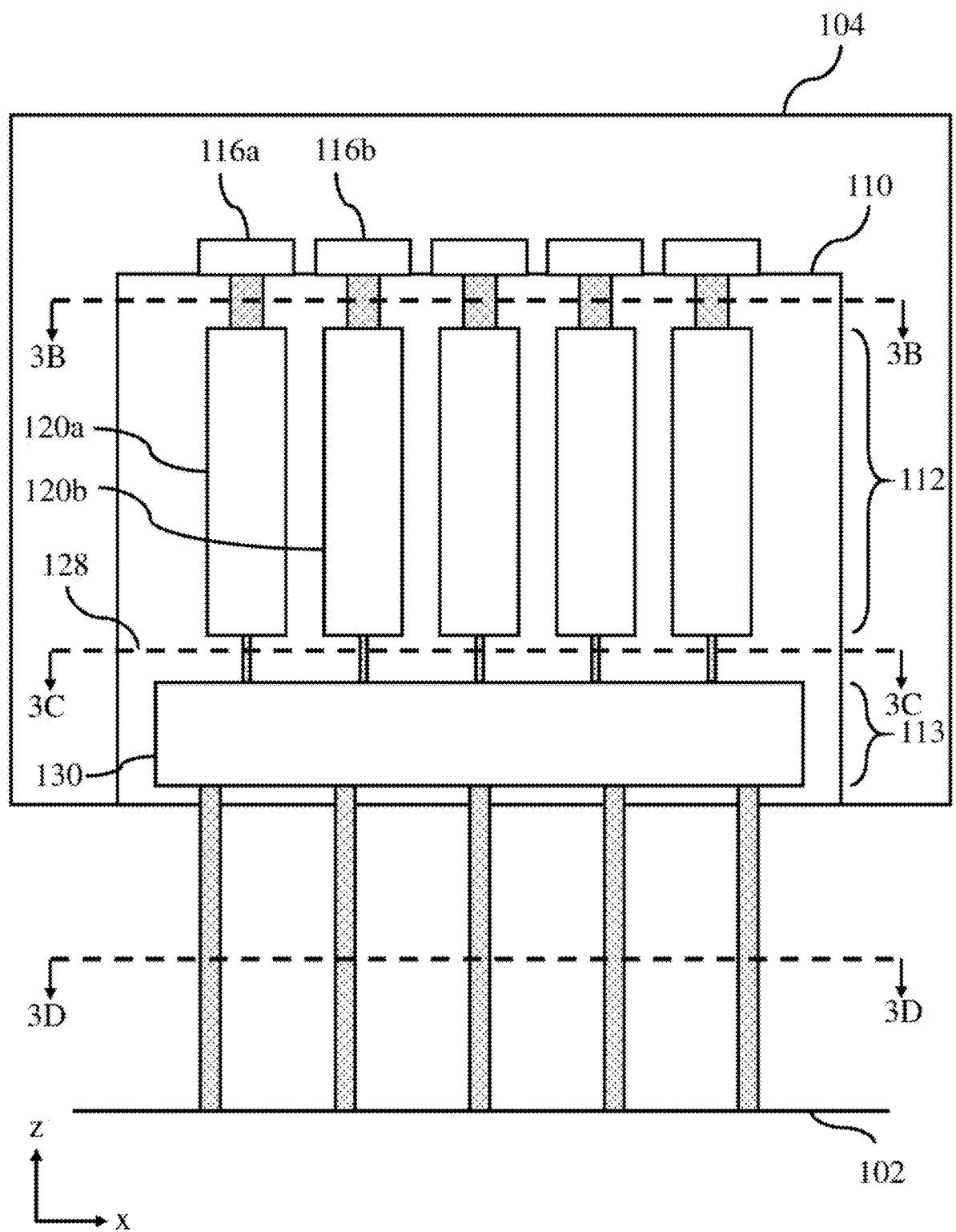
FIG. 3A depicts the optics assembly of FIG. 2, highlighting different laser beam cross sections.
Figure 3B:
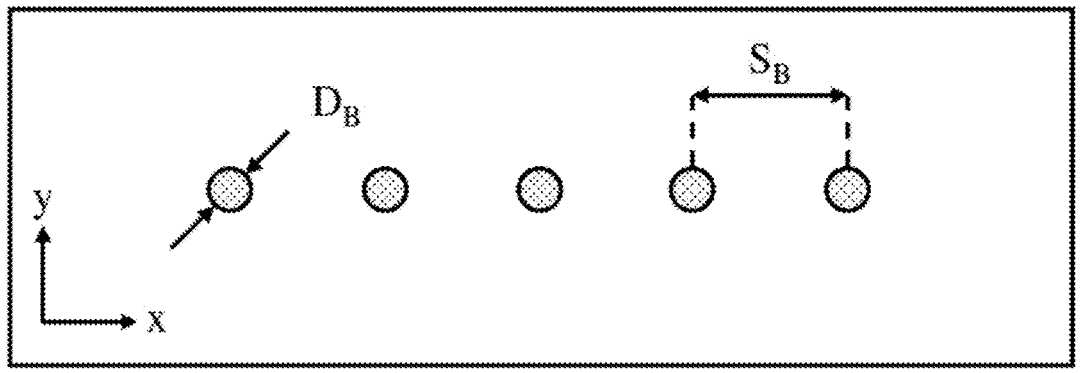
FIG. 3B shows the cross-sectional size and spacing of laser beams at cross section 3B-3B indicated in FIG. 3A.
Figure 3C:
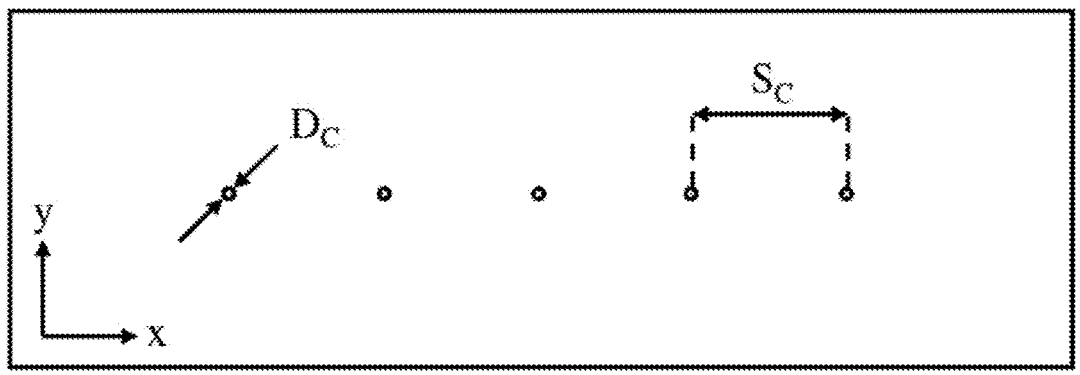
FIG. 3C shows the cross-sectional size and spacing of laser beams at cross section 3C-3C indicated in FIG. 3A.
Figure 3D:
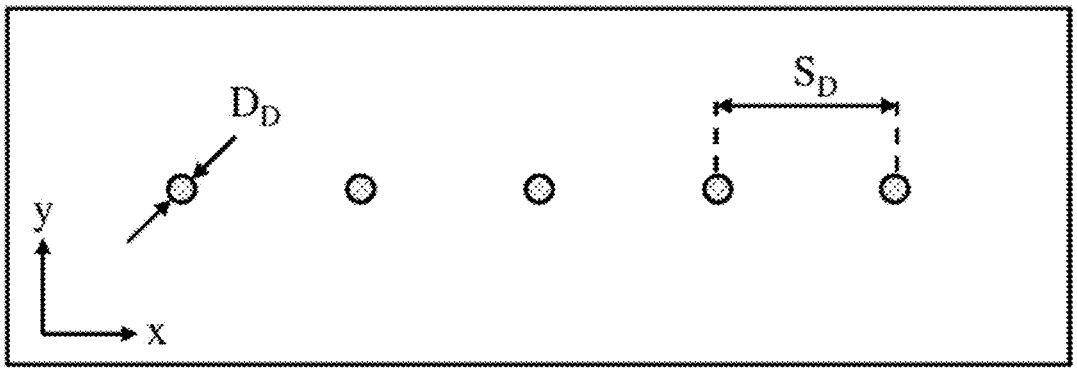
FIG. 3D shows the cross-sectional size and spacing of laser beams at cross section 3D-3D indicated in FIG. 3A.

FIG. 3A depicts the laser assembly 104 of FIG. 2, highlighting regions with different laser beam cross sections. These cross sections are shown in FIGS. 3B-3D. Cross section 3B-3B is taken at a location after the laser beams 106 exit their respective laser sources 116, but before the laser beams 106 enter their respective micro optics assemblies 120. Cross section 3C-3C is taken at a location after the laser beams 106 exit their respective micro optics assemblies 120, but before the laser beams 106 enter the macro optics assemblies 130. In some embodiments, cross section 3C-3C may also be associated with an intermediate image plane 128. Cross section 3D-3D is taken at a location after the laser beams 106 exit the macro optics assemblies 130. In some embodiments, the cross section 3D-3D may additionally be representative of the laser beam spot pattern on a build surface 102.

FIG. 3B shows the cross-sectional size and spacing of laser beams at cross section 3B-3B indicated in FIG. 3A, before the laser beams enter the micro optics assemblies 120. At this point, each laser beam may have a diameter $D_B$, and may be spaced a distance of $S_B$ apart from an adjacent laser beam. Without wishing to be bound by theory, the size and/or spacing of the laser beams at cross section 3B-3B may be dependent, at least in part, on a size and/or spacing of the laser sources and/or any intervening optical components, including but not limited to optical fibers.

FIG. 3C shows the cross-sectional size and spacing of laser beams at cross section 3C-3C indicated in FIG. 3A, after the laser beams exit the micro optics assemblies 120 but before the laser beams enter the macro optics assembly 130. At this point, each laser beam may have a diameter $D_C$, and may be spaced a distance of $S_C$ apart from an adjacent laser beam. Depending on the arrangement of optical elements within the micro optics assemblies 120, the diameter of each beam after exiting the micro optics assemblies 120 may be greater than, less than, or equal to the diameter of each beam before entering the micro optics assemblies 120. That is, in some embodiments $D_C>D_B$, in some embodiments $D_C<D_B$, and in some embodiments $D_C=D_B$.

Because each micro optics assembly 120 may only alter parameters associated with a single laser beam, parameters relating to the relationship between multiple different beams may be unaffected. For example, the spacing between beams after exiting the micro optics assemblies 120 may be substantially equal to the spacing between beams before entering the micro optics assemblies 120. That is, in some embodiments $S_C$ may be substantially equal to $S_B$.

FIG. 3D shows the cross-sectional size and spacing of laser beams at cross section 3D-3D indicated in FIG. 3A, after the laser beams exit the macro optics assemblies 130. In some embodiments, the cross-sectional size and spacing of the laser beams at cross section 3D-3D may be substantially equal to the size and spacing of laser beam spots on a build surface 102. At cross section 3D-3D, each laser beam may have a diameter $D_D$, and may be spaced a distance of $S_D$ apart from an adjacent laser beam. Depending on the arrangement of optical elements within the macro optics assembly 130, the diameter of each beam after exiting the macro optics assembly 130 may be greater than, less than, or equal to the diameter of each beam before entering the macro optics assembly 130. That is, in some embodiments $D_D>D_C$, in some embodiments $D_D<D_C$, and in some embodiments $D_D=D_C$.

Because the macro optics assembly 130 may alter parameters associated with all laser beams entering the macro optics assembly simultaneously, parameters relating to the relationship between multiple different beams may be affected in addition to parameters relating to a single beam. For example, the spacing between laser beams after exiting the macro optics assembly 130 may be greater than, less than, or equal to the spacing between laser beams before entering the macro optics assembly 130. That is, in some embodiments $S_D>S_C$, in some embodiments $S_D<S_C$, and in some embodiments $S_D=S_C$.

It should be appreciated that, in some embodiments, a change in laser beam diameter due to a macro optics assembly may be related to a change in laser beam spacing due to the macro optics assembly. For instance, if a beam diameter increases after passing through the macro optics assembly 130, the beam spacing may also increase (i.e., $D_D>D_C$ may imply that $S_D>S_C$). In some embodiments, a magnitude of a beam diameter change may be proportional to a magnitude of a beam spacing change, or may be equal. For example, if a beam diameter increases twofold after passing through the macro optics assembly 130, the beam spacing may also increase twofold (i.e., $D_D=2*D_C$ may imply that $S_D=2*S_C$).

Figure 3E:
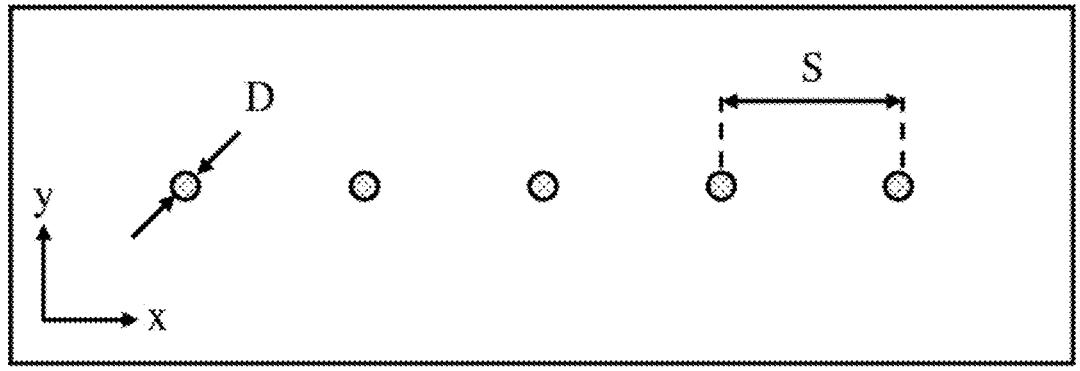
FIG. 3E shows a cross-section of one embodiment of laser beams in a linear array.
Figure 3F:
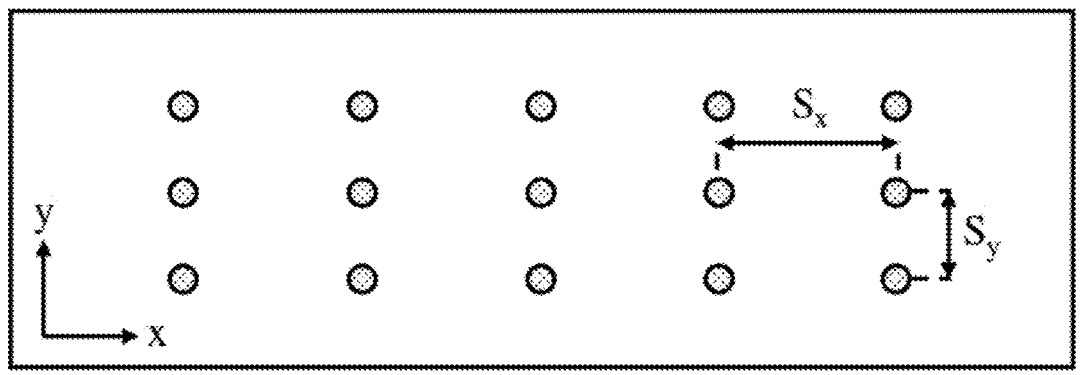
FIG. 3F shows a cross-section of one embodiment of laser beams in a rectangular array.
Figure 3G:
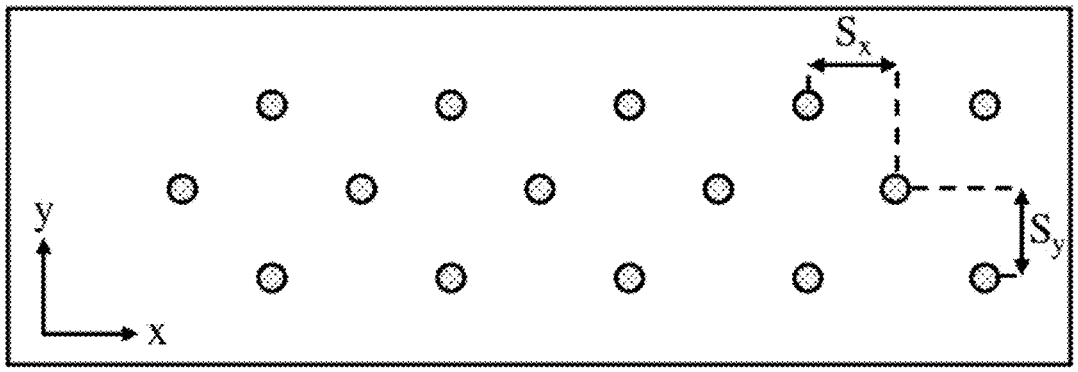
FIG. 3G shows a cross-section of one embodiment of laser beams in a staggered array.

FIGS. 3E-3G show different cross-sections of arrays of laser beams. It should be appreciated that, in contrast to FIGS. 3B-3D, the cross-sections of FIGS. 3E-3G may not correspond to any specific point depicted in FIG. 3A. FIG. 3E depicts one embodiment of a linear array of laser beams. A linear array of laser beams may include a plurality of laser beams arrange collinearly and spaced a distance S apart. It should be appreciated that a spacing between adjacent laser beams in a linear array (or any other array) may be regular or irregular, as the disclosure is not limited in this regard. FIG. 3F depicts one embodiment of a rectangular array of laser beams. Laser beams arranged in a rectangular array may be aligned in perpendicular rows and columns. Adjacent columns may be spaced a distance $S_x$ apart, and adjacent rows may be spaced a distance $S_y$ apart. It should be appreciated that a rectangular array may include any suitable spacing along any dimension, as the disclosure is not limited in this regard. That is, in some embodiments $S_x>S_y$, in some embodiments $S_x<S_y$, and in some embodiments $S_x=S_y$. It should also be appreciated that an orientation of a rectangular array (or any other array) need not be calibrated relative to any portion of an additive manufacturing system, such as a build plate.

Rather, an array may be disposed in any suitable orientation. FIG. 3G depicts one embodiment of a staggered array of laser beams. In a staggered array, adjacent rows of laser beams may be staggered. Adjacent laser beams may be spaced a distance $S_x$ apart, and adjacent rows may be spaced a distance $S_y$ apart. It should be appreciated that a staggered array may have any suitable spacing along any dimension, as the disclosure is not limited in this regard. That is, in some embodiments $S_x>S_y$, in some embodiments $S_x<S_y$, and in some embodiments $S_x=S_y$. While embodiments of specific arrays and arrangements of laser beams have been described, it should be appreciated that the disclosure is not limited to any specific arrangement of laser beams.

Figure 4:
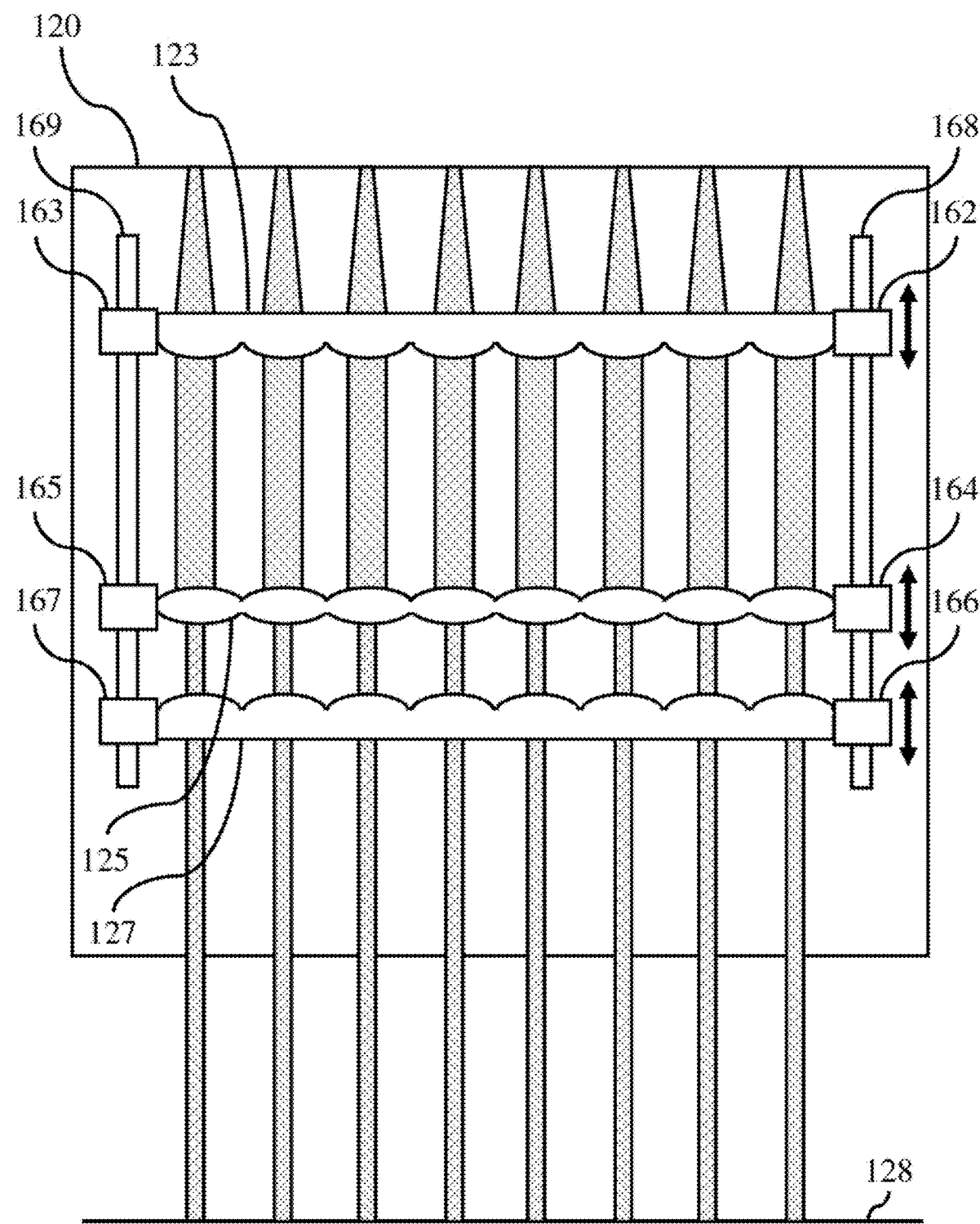
FIG. 4 depicts one embodiment of a micro optics assembly with continuous adjustment of the optics.

FIG. 4 depicts one embodiment of a micro optics assembly 120 with continuous adjustment of the optics contained therein. In this embodiment, positions of a first microlens array 123, a second microlens array 125, and a third microlens array 127 may be adjustable relative to one another. For example, the position of the first microlens array 123 may be adjusted using an actuator 162 configured to move a first portion of the microlens array 123 along a first rail 168, and a passive component 163 configured to allow motion of a second portion of the micro lens array 123 along a second rail 169. Of course, other adjustable lenses may be associated with other components configured to enable motion. For example, the second microlens array 125 may be associated with an actuator 164 and/or a passive component 165, and the third microlens array 127 may be associated with an actuator 166 and/or a passive component 167. It should be appreciated that a micro optics assembly 120 with continuous adjustment of optical elements may include automated and/or manual adjustment of optical elements, as the disclosure is not limited in this regard. Actuators may include brushless motors, brushed motors, stepper motors, linear stages, belt drives, hydraulic actuators, pneumatic actuators, piezoelectric actuators, and/or any other suitable actuator configured to adjust a position and/or orientation of a microlens array. Passive elements may include ball bearings, roller bearings, thrust bearings, bushings, or any other suitable element. In some embodiments, a position and/or orientation of a microlens array may be adjusted manually. Manual adjustments may include adjusting the position of one or more lenses along a guide rail, adjusting a set screw, and/or any other suitable manner of manual adjustment of a microlens array known in the art. It should be appreciated that a micro optics assembly may also include discrete adjustment of optics, as the disclosure is not limited to continuous adjustment of optics. Additionally, it should be appreciated that a microlens array may include convex, concave, and/or flat surfaces, as the disclosure is not limited in regard to the curvature of a microlens or a portion of a microlens array.

Figure 5A:
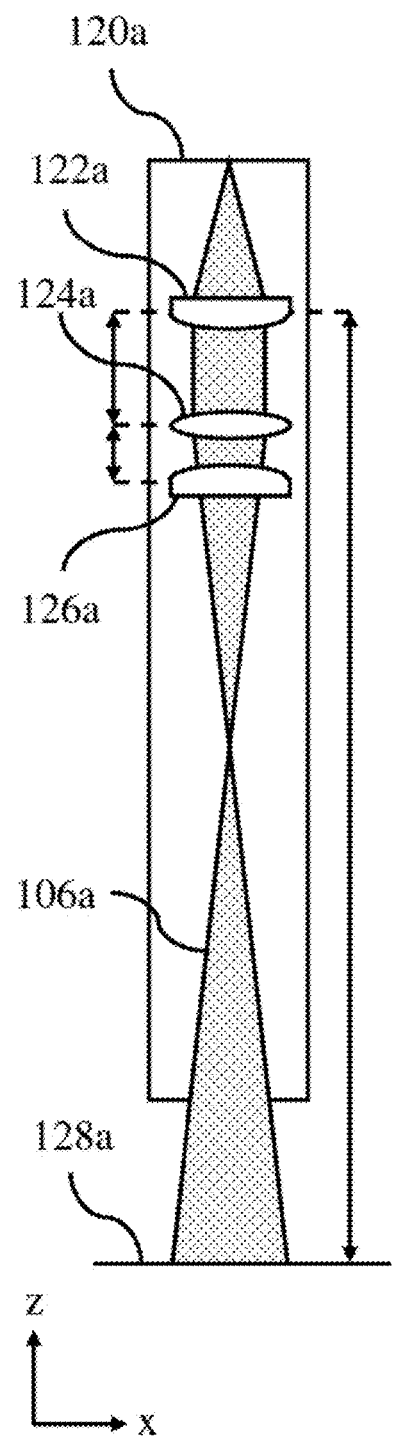
FIG. 5A depicts one embodiment of a micro optics assembly with the optics in a first arrangement.
Figure 5B:
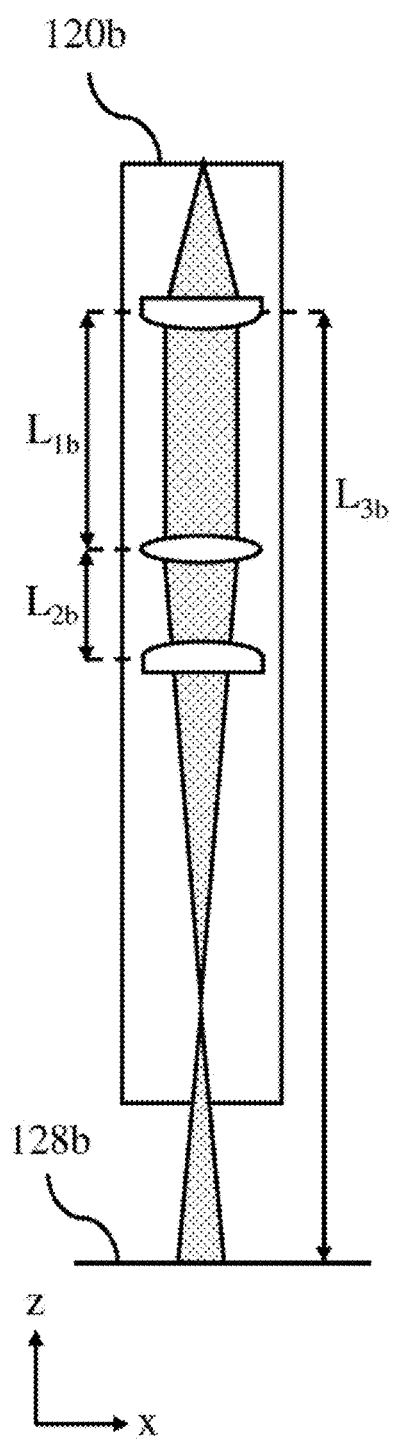
FIG. 5B depicts one embodiment of a micro optics assembly with the optics in a second arrangement.
Figure 5C:
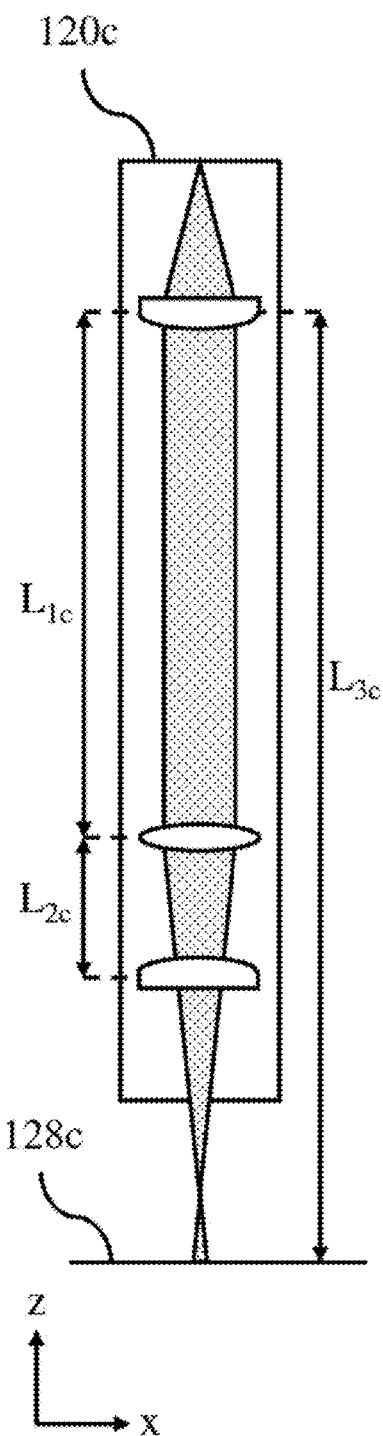
FIG. 5C depicts one embodiment of a micro optics assembly with the optics in a third arrangement.

FIGS. 5A-5C depict one embodiment of a micro optics assembly 120 with optical elements in different arrangements. Considering FIG. 5A, the micro optics assembly 120a may include a first lens 122a, a second lens 124a, and a third lens 126a. As previously described, these lenses may be micro lenses and/or associated portions of separate microlens arrays. It should be appreciated that analogous micro optics assemblies 120b and 120c in FIGS. 5B and 5C, respectively, may have similar components, but that these components are not labelled in FIGS. 5B and 5C for clarity.

Referring to FIG. 5A, the first lens 122a may be configured to collimate a laser beam entering the micro optics assembly 120a. In some embodiments, the first lens may be a cross cylinder lens. The second lens 124a and the third lens 126a may collectively form a doublet lens. In some embodiments, the positions of each of the first, second, and third lenses may be adjustable. In some embodiments, the position of the first lens may be fixed, and the positions of the second and third lenses may be adjustable. Regardless of which lens(es) may remain stationary and which lens(es) may be adjustable, distances between the first lens and the second lens, between the second lens and the third lens, and/or between the first lens and the third lens may be variable, as explained below.

Considering either FIG. 5B or 5C, various dimensions are labelled. Referring to FIG. 5B, a distance between the first lens and the second lens is denoted $L_{1b}$, a distance between the second lens and the third lens is denoted $L_{2b}$, and a distance between the first lens and the intermediate image plane 128b is denoted $L_{3b}$. FIG. 5C is labelled analogously. It should be appreciated that the analogous micro optics assembly 120a in FIG. 5A may have similar dimensions, but that these dimensions are not labelled in FIG. 5A for clarity.

Referring to FIG. 5B, the distance $L_{2b}$ between the second lens 124 and the third lens 126 (i.e., the spacing between the two lenses of the doublet lens) may control a magnification of the laser beam. Without wishing to be bound by theory, a larger spacing between the second lens 124 and the third lens 126 may be associated with a smaller magnification, while a smaller spacing between the second lens 124 and the third lens 126 may be associated with a greater magnification. The distance Lib between the first lens 122 and the second lens 124 may be adjusted to control a distance $L_{3b}$ to the intermediate image plane 128b. Without wishing to be bound by theory, for any distance $L_{2b}$ (within certain ranges), the distance $L_{1b}$ may be adjusted such that the distance $L_{3b}$ remains constant. Adjusting the distance of the doublet lens from the first lens based, at least in part, on the spacing between the two lenses of the doublet lens may allow the optics of a microlens array to remain focused on the intermediate image plane 128b (i.e., adjusting $L_{1b}$ based, at least in part, on $L_{2b}$ may keep $L_{3b}$ constant). For example, in the depicted embodiment, where the first lens is held stationary, a constant distance $L_{3b}$ and $L_{3c}$ may be maintained between the first lens and the intermediate image plane. As such, a single intermediate image plane 128 may be maintained regardless of the degree of magnification in a micro optics assembly 120. That is, different micro optics assemblies 120 may have different magnifications and yet may maintain the same intermediate image plane 128 at a constant location. Stated differently, the one or more micro optics assemblies of a system may be controlled such that the magnification of the one or more micro optics assemblies 120 may be adjusted without adjusting the location of the intermediate image plane 128.

Figure 6:
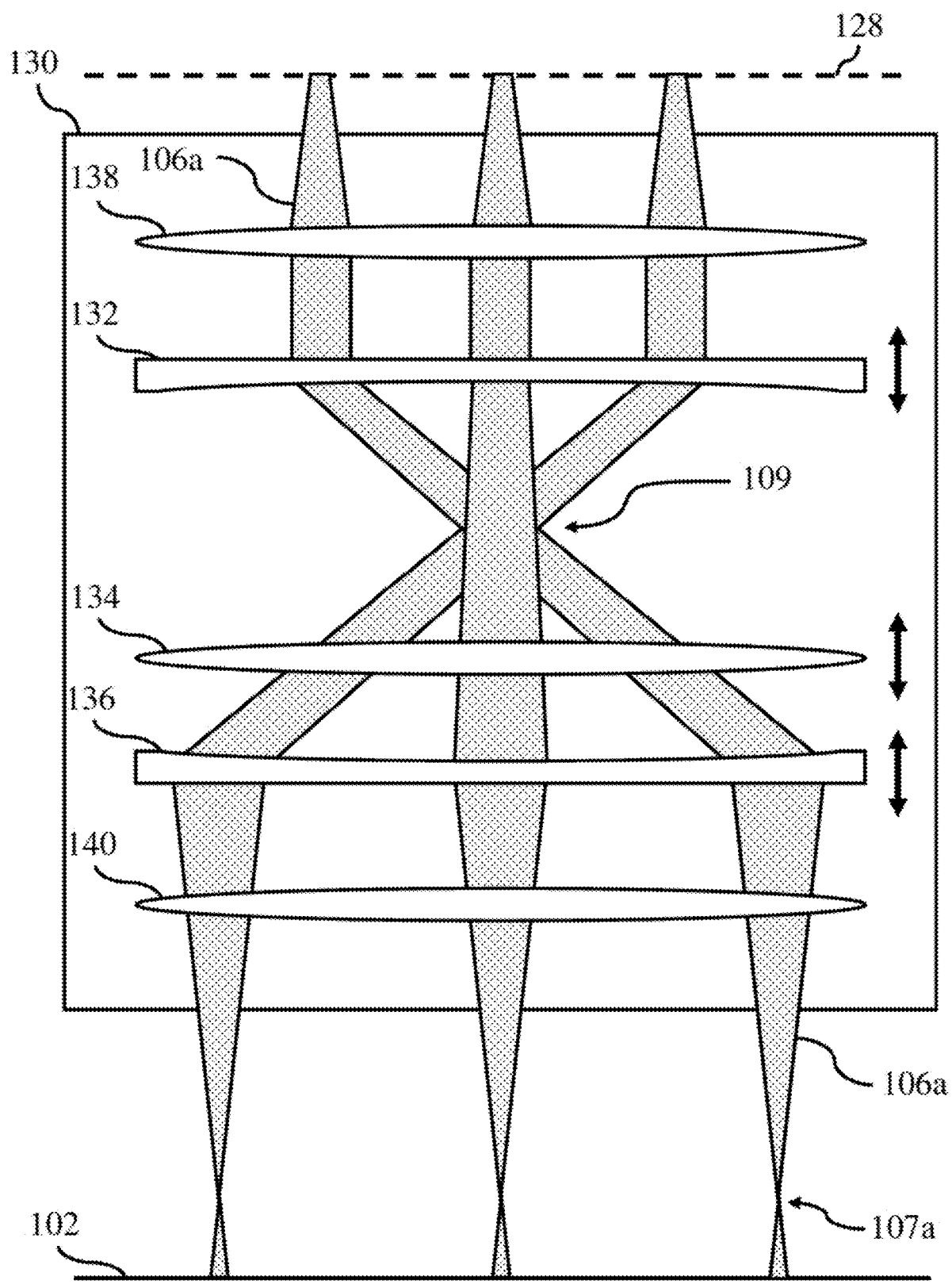
FIG. 6 depicts one embodiment of a macro optics assembly.

FIG. 6 depicts one embodiment of a macro optics assembly 130, which may include a first lens 132, a second lens 134, and a third lens 136. In some embodiments, the first lens 132 may be a cross cylinder lens. The second lens 134 and the third lens 136 may collectively form a doublet lens. In some embodiments, the macro optics assembly 130 may include additional lenses, such as one or more lenses 138 before the first lens 132, and/or one or more lenses 140 after the third lens 136. In some embodiments, the positions of each of the first, second, and third lenses may be adjustable, as explained in greater detail in reference to FIGS. 7 and 8. As described above, the macro optics assembly 130 may be configured to adjust both the size of the individual laser beams 106 as well as the spacing between the plurality of laser beams 106 output from the plurality of micro optics assemblies 120, while keeping the laser beams 106 focused on the build surface 102. That is, the macro optics assembly 130 may be configured to re-image the intermediate image plane 128 to the build surface 102 with a variable magnification while maintaining a constant working distance.

In some embodiments, a laser beam 106a may include a power point 107a. The power point 107a of the laser beam 106a may be disposed at any suitable location, as the disclosure is not limited in this regard. In some embodiments, a power point 107a may be disposed proximal to a build surface 102. In some embodiments, a power point 107a may be disposed between the first lens 132 and the second lens 134 of a macro optics assembly 130. In some embodiments, a power point may be distinct from a crossover point 109 of the plurality of laser beams. Without wishing to be bound by theory, a location of a power point 107a may be a function of arrangements of both a micro optics assembly 120 and a macro optics assembly 130, whereas a location of a crossover point 109 may be a function of an arrangement of a macro optics assembly 130. In some embodiments, a crossover point 109 may be proximal to a power point 107, while in some embodiments, a crossover point 109 may be distal to a power point 107. It should be appreciated that a crossover point 109 may be located at any suitable position along an optical path, as the disclosure is not limited in this regard. Of course, it should be appreciated that, in some embodiments, a crossover point 109 and a power point 107 may be disposed at the same location, as the disclosure is not limited in this regard.

Figure 7:
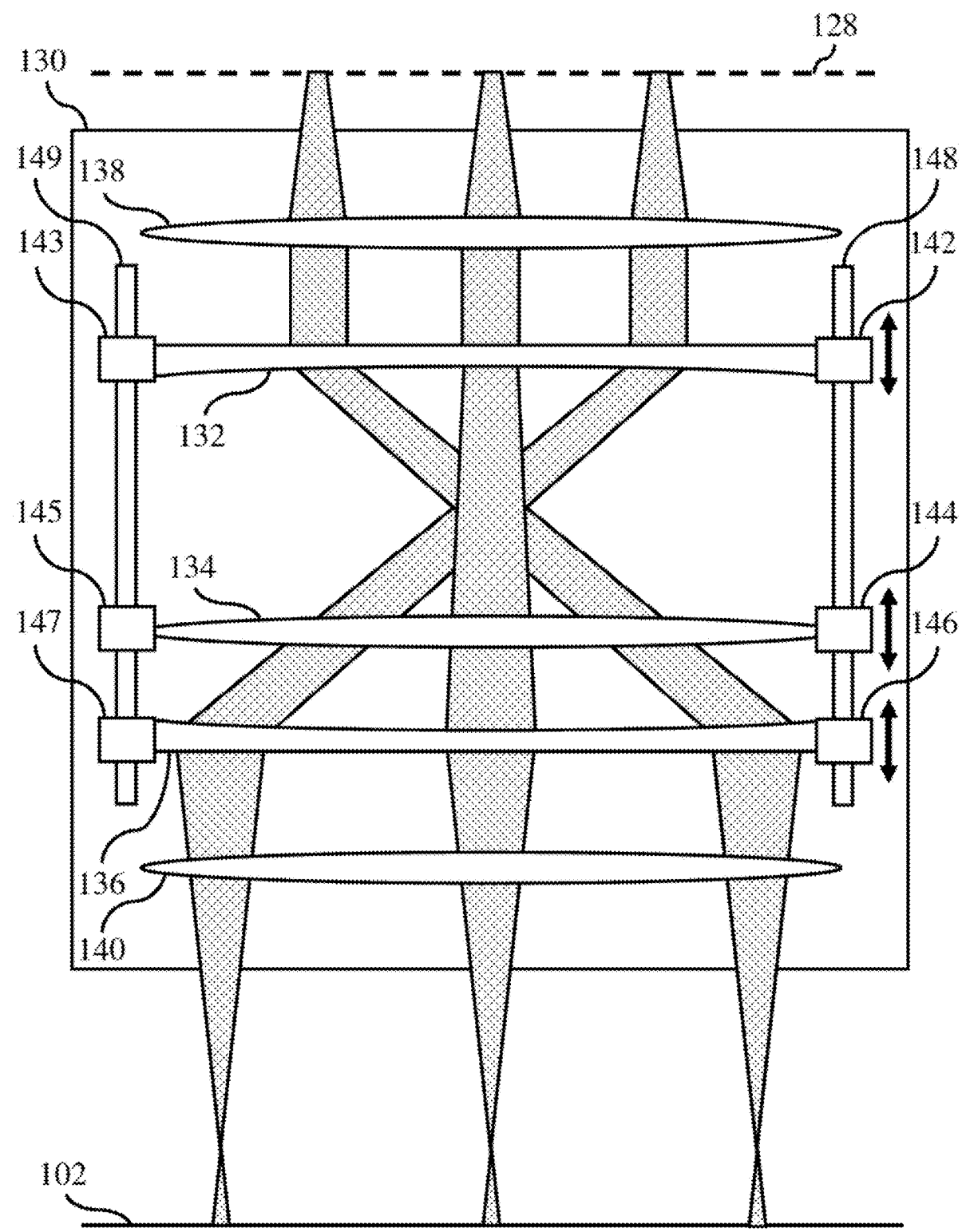
FIG. 7 depicts one embodiment of a macro optics assembly with continuous adjustment of the optics.

FIG. 7 depicts one embodiment of a macro optics assembly 130 with continuous adjustment of optics. In this embodiment, positions of the first lens 132, the second lens 134, and the third lens 136 may be adjustable. For example, the position of the first lens 132 may be adjusted using an actuator 142 configured to move a first portion of the lens 132 along a first rail 148, and a passive component 143 configured to allow motion of a second portion of the lens 132 along a second rail 149. Of course, other adjustable lenses may be associated with other components configured to enable motion. For example, the second lens 134 may be associated with an actuator 144 and/or a passive component 145, and the third lens 136 may be associated with an actuator 146 and/or a passive component 147. It should be appreciated that a macro optics assembly 130 with continuous adjustment of optical elements may include automated and/or manual adjustment of optical elements, as the disclosure is not limited in this regard. Actuators may include brushless motors, brushed motors, stepper motors, linear stages, belt drives, hydraulic actuators, pneumatic actuators, piezoelectric actuators, and/or any other suitable actuator configured to adjust a position and/or orientation of a lens. Passive elements may include ball bearings, roller bearings, thrust bearings, bushings, or any other suitable element. In some embodiments, a position and/or orientation of a lens may be adjusted manually. Manual adjustments may include adjusting the position of one or more lenses along a guide rail, adjusting a set screw, and/or any other suitable manner of manual adjustment of a lens known in the art.

Figure 8:
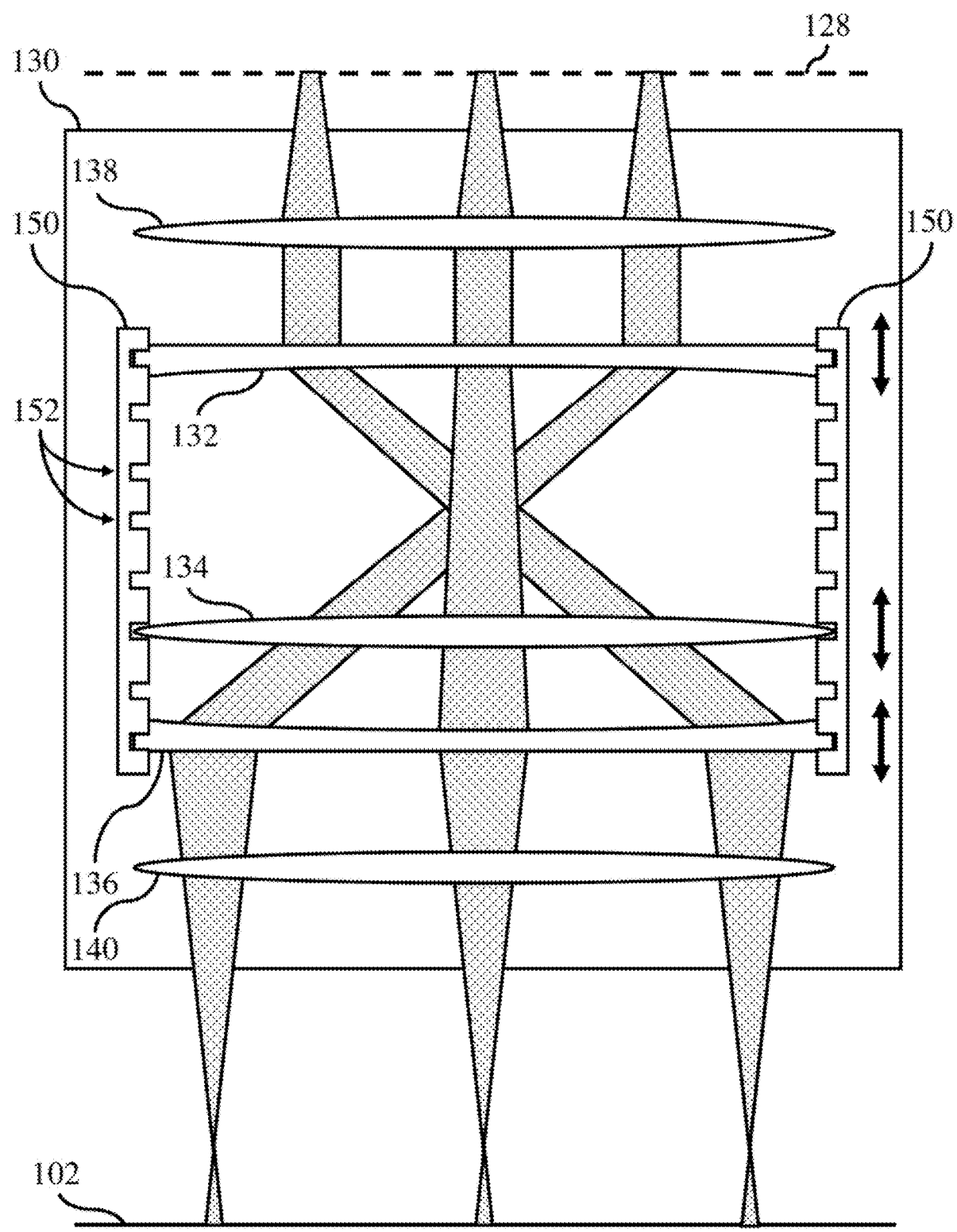
FIG. 8 depicts one embodiment of a macro optics assembly with discrete adjustment of the optics.

FIG. 8 depicts one embodiment of a macro optics assembly 130 with discrete adjustment of optics. In this embodiment, positions of the first lens 132, the second lens 134, and the third lens 136 may be adjustable. For example, the position of the first lens 132 may be adjusted by moving the lens between slots 152 of one or more guides 150 configured to retain the first lens 132. Of course, other adjustable lenses may be configured to interface with the slots 152 of the guides 150 or any other appropriate fixture capable of maintaining a lens, or other optical component, in a desired orientation and/or configuration during operation. It should be appreciated that a macro optics assembly 130 with discrete adjustment of optical elements may include automated and/or manual adjustment of optical elements, as the disclosure is not limited in this regard.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone, tablet, or any other suitable portable or fixed electronic device.

Also, a computing device may have one or more input and output devices. These devices can be used, among other things, to present a user interface. Examples of output devices that can be used to provide a user interface include display screens for visual presentation of output and speakers or other sound generating devices for audible presentation of output. Examples of input devices that can be used for a user interface include keyboards, individual buttons, and pointing devices, such as mice, touch pads, and digitizing tablets. As another example, a computing device may receive input information through speech recognition or in other audible format.

Such computing devices may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, RAM, ROM, EEPROM, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computing devices or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

What is claimed is:

1. An additive manufacturing system comprising:
   a build surface;
   a plurality of laser energy sources configured to produce a plurality of lasers to form a plurality of laser spots on the build surface;
   a plurality of lens arrays configured to receive the plurality of lasers from the plurality of laser energy sources and comprising a first lens array and a second lens array, wherein the first lens array and the second lens array are each independently actuatable to change a spacing therebetween for adjustment of a size of each of the plurality of laser spots on the build surface; and
   at least one lens, wherein the at least one lens is configured to adjust a spacing between the plurality of laser spots on the build surface.

2. The additive manufacturing system of claim 1, wherein the at least one lens comprises a plurality of lenses.

3. The additive manufacturing system of claim 1, wherein adjusting a position of the at least one lens adjusts a position of a focal plane.

4. The additive manufacturing system of claim 1, further comprising at least one actuator configured to control a position of the first lens array, the second lens array, and/or the at least one lens to provide independent control of the size and/or the spacing of the plurality of laser spots on the build surface.

5. The additive manufacturing system of claim 1, further comprising a plurality of slots, each slot configured to receive the first lens array, the second lens array, and/or the at least one lens to hold the first lens array, the second lens array, and/or the at least one lens in a predetermined configuration to provide independent control of the size and/or the spacing of the plurality of laser spots on the build surface.

6. The additive manufacturing system of claim 1, wherein the plurality of lens arrays is configured to maintain an intermediate image plane at a fixed position between the plurality of lens arrays and the at least one lens.

7. The additive manufacturing system of claim 2, wherein a spacing between at least two lenses of the plurality of lenses is variable to adjust the spacing between the plurality of laser spots on the build surface.

8. The additive manufacturing system of claim 2, wherein the plurality of lens arrays is located before the at least one lens along an optical path of the plurality of lasers from the plurality of lenses.

9. The additive manufacturing system of claim 1, wherein the plurality of lens arrays is a plurality of lenslet arrays.

10. The additive manufacturing system of claim 1, wherein the plurality of lens arrays includes a third lens array.

11. The additive manufacturing system of claim 1, wherein the first lens array is configured to collimate a plurality of laser beams emitted by the plurality of laser energy sources.

12. The additive manufacturing system of claim 10, wherein the second lens array and the third lens array form a doublet lens array.

13. The additive manufacturing system of claim 12, wherein the spacing between the first lens array and the doublet lens array is variable to adjust a position of an intermediate image plane.

14. The additive manufacturing system of claim 10, wherein a spacing between the second lens array and the third lens array is variable to adjust the size of each of the plurality of laser spots on the build surface.

15. An additive manufacturing system comprising:
    a build surface;
    a plurality of laser energy sources configured to produce a plurality of laser spots on the build surface; and
    an optics assembly configured to independently control a size of each of the plurality of laser spots and a spacing between the plurality of laser spots on the build surface, the optics assembly comprising:
    a plurality of lens arrays comprising a first lens array and a second lens array that are each independently actuatable to change a spacing therebetween for adjustment of the size of each of the plurality of laser spots on the build surface.

16. The additive manufacturing system of claim 15, wherein the optics assembly comprises at least one lens, wherein the at least one lens is configured to adjust the spacing between the plurality of laser spots on the build surface.

17. The additive manufacturing system of claim 16, further comprising a first actuator configured to control the spacing between the first lens array and the second lens array.

18. The additive manufacturing system of claim 17, wherein the at least one lens comprises at least two lenses, and further comprising a second actuator configured to control a spacing between the at least two lenses.

19. The additive manufacturing system of claim 18, further comprising a processor operatively coupled to the plurality of laser energy sources, the first actuator, and the second actuator, and wherein the processor is configured to independently control an intensity of a plurality of laser beams, the size of the plurality of laser spots, and the spacing between the plurality of laser spots.

20. The additive manufacturing system of claim 19, wherein the processor controls the size of the plurality of laser spots and the spacing between the plurality of laser spots by actuating the first actuator and/or the second actuator.

21. The additive manufacturing system of claim 1, wherein the plurality of lens arrays is a plurality of automatically adjustable lens arrays.

22. The additive manufacturing system of claim 6, wherein each lens array of the plurality of lens arrays is configured to focus a corresponding laser of the plurality of lasers at the same distance to maintain the intermediate image plane at the fixed position.

23. The additive manufacturing system of claim 13, wherein each of the first lens array and the doublet lens array are configured to focus a corresponding laser of the plurality of lasers at the same distance to adjust the position of the intermediate image plane.

24. The additive manufacturing system of claim 15, wherein the optics assembly comprises a first stage and a second stage, and wherein the first stage is configured to maintain an intermediate image plane at a fixed position between the first stage and the second stage.

25. The additive manufacturing system of claim 24, wherein each portion of the first stage is configured to focus a corresponding output of the plurality of laser energy sources at the same distance to maintain the intermediate image plane at the fixed position.

26. The additive manufacturing system of claim 1, wherein the at least one lens is configured to adjust a center-to-center spacing between the plurality of laser spots on the build surface.

27. The additive manufacturing system of claim 15, wherein the optics assembly is configured to independently control a center-to-center spacing between the plurality of laser spots on the build surface.

28. The additive manufacturing system of claim 1, wherein at least one of the first lens array or the second lens array is a microlens array.

29. The additive manufacturing system of claim 15, wherein at least one of the first lens array or the second lens array is a microlens array.

30. The additive manufacturing system of claim 15, wherein the plurality of lens arrays is a plurality of automatically adjustable lens arrays.

* * * * *